US011375726B2

(12) United States Patent
Hoover (10) Patent No.: US 11,375,726 B2
(45) Date of Patent: Jul. 5, 2022

(54) STORAGE OF POST-CLIMACTERIC FRUIT

(71) Applicant: John C. Hoover, Fernandina Beach, FL (US)

(72) Inventor: John C. Hoover, Fernandina Beach, FL (US)

( * ) Notice: Subject to any disclaimer, the term of this patent is extended or adjusted under 35 U.S.C. 154(b) by 0 days.

(21) Appl. No.: 16/987,259

(22) Filed: Aug. 6, 2020

(65) Prior Publication Data

US 2022/0039413 A1     Feb. 10, 2022

(51) Int. Cl.
| | |
|---|---|
| *F25B 21/02* | (2006.01) |
| *A23B 7/005* | (2006.01) |
| *A23B 7/04* | (2006.01) |
| *A23B 7/144* | (2006.01) |
| *F25D 17/04* | (2006.01) |
| *F24F 11/00* | (2018.01) |
| *F25B 29/00* | (2006.01) |

(52) U.S. Cl.
CPC ............... *A23B 7/005* (2013.01); *A23B 7/04* (2013.01); *A23B 7/144* (2013.01); *A23V 2002/00* (2013.01); *F24F 11/00* (2013.01); *F25B 21/02* (2013.01); *F25B 29/00* (2013.01); *F25D 17/04* (2013.01)

(58) Field of Classification Search
CPC ...... F25B 21/02; F25B 21/04; F25B 2321/02; F25B 2321/021; F25B 2321/023; F25B 2321/025; A23B 7/144
See application file for complete search history.

(56) References Cited

U.S. PATENT DOCUMENTS

| | | | |
|---|---|---|---|
| 3,459,116 A | 8/1969 | McDonnell | |
| 5,771,790 A | 6/1998 | Barrows | |
| 5,782,094 A | 7/1998 | Freeman | |
| 10,093,473 B1 | 10/2018 | Stanford et al. | |
| 2012/0198862 A1 | 8/2012 | Arrigo | |
| 2012/0304667 A1* | 12/2012 | Shin | F25D 11/025 62/3.6 |
| 2017/0042373 A1* | 2/2017 | Alexander | A47G 19/02 |
| 2018/0031298 A1* | 2/2018 | Kim | F25D 11/022 |
| 2019/0162460 A1* | 5/2019 | Oh | F25D 16/00 |
| 2019/0186806 A1* | 6/2019 | Oh | F25D 17/065 |
| 2019/0254298 A1* | 8/2019 | Carballo | A23B 7/0425 |

* cited by examiner

*Primary Examiner* — Brian M King
(74) *Attorney, Agent, or Firm* — Fogg & Powers LLC (57) ABSTRACT

Systems and methods for storing post-climacteric fruit are described. The system is scalable for home or commercial use and extends the storage life of fruit sensitive to over-ripening and spoilage because of the emission of ethylene gas. The described systems circulate and remove the ethylene gas, emitted by the fruit, from within an enclosure containing the fruit. Also, the system may store the fruit at an average temperature that extends the storage life of the fruit. The systems accomplish these objectives by thermally cycling the temperature of the air/gas within the enclosure containing the fruit about a desired storage temperature. The change in temperature may cause the air to expand and contract. Mechanisms allow the expanding and contracting air to exchange the gas within the enclosure with the air outside the enclosure, inducing the flushing of the ethylene gas.

13 Claims, 4 Drawing Sheets

STORAGE OF POST-CLIMACTERIC FRUIT

BACKGROUND

Edible fruits have played an essential role in the diets of humans throughout history and account for a substantial fraction of the world's agricultural output. As fruits are a means through which plants disseminate seeds, some fruits have an appealing tasting flesh that frequently is consumed by humans. In disseminating the seeds or other botanical processes, some fruits pass through a ripening process that includes a climacteric event. When the climacteric event occurs, the fruit is fully matured and frequently has desirable characteristics regarding taste and texture. As part of the climacteric event, some fruits increase respiration of ethylene, and cell death increases. Additionally, in conjunction with the increased rate of cell death, the fruit becomes more susceptible to harmful microorganisms like bacteria and fungi. Typically, the rate of cell death reflects the amount of ethylene gas surrounding the fruit.

SUMMARY

Systems and methods for storage of post-climacteric fruit are provided. In certain embodiments, a system includes an enclosure having an interior volume for storing fruit therein. The system also includes a thermal module that cools and heats air within the interior volume of the enclosure. Further, the system includes a gas exchanger that allows air to move in and out of the enclosure. Additionally, the system includes a controller that directs the thermal module to thermal cycle a temperature of the air within the interior volume about a desired storage temperature.

DRAWINGS

Understanding that the drawings depict only some embodiments and are not, therefore, to be considered limiting in scope, the exemplary embodiments will be described with additional specificity and detail using the accompanying drawings, in which.

Per common practice, the various described features are not drawn to scale but are drawn to emphasize specific features relevant to the example embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made.

Systems and methods for the storage of post-climacteric fruit are provided herein. Certain fruits may experience climacteric events. Some of these fruits include bananas, apples, melons, apricots, tomatoes, among other fruits. When the climacteric event occurs, the fruits begin to respirate increased amounts of ethylene. The rate of ripening after the climacteric event is sensitive to the amount of ethylene surrounding the fruit. Accordingly, post-climacteric fruits (fruit that has experienced the climacteric event) are prone to over-ripening and spoilage due to the presence of respired ethylene. As such, removing the ethylene gas from the environment of the fruit may reduce the rate of ripening.

Additionally, the rate of post-climacteric fruit ripening is related to the storage temperature of the fruit. If the fruit is stored at an appropriate temperature, the rate of ripening may be reduced. For example, for bananas, if the temperature is maintained around 57° F., the ripening rate decreases, extending the time that the fruit has a desired taste and texture.

In certain embodiments, an enclosure can store post-climacteric fruits by cycling the temperature within the enclosure about the desired temperature and using the temperature cycling of the environment within the enclosure to remove ethylene within the enclosure. For example, the temperature cycling may cause the air within the enclosure (containing the ethylene generating fruit) to exchange with the air found in the environment outside the enclosure.

In some embodiments, the enclosure may encompass a thermal module that is directed to control the temperature within the enclosure. As the temperature is cycled, the air within the enclosure may expand and contract. The enclosure may have one or more valves that allow the air in the enclosure to mix with the air outside the enclosure. Specifically, the rising air temperature within the enclosure may force a portion of the expanding air out of the enclosure through a valve into the external environment of the enclosure. Conversely, the decreasing air temperature within the enclosure may draw air from the environment outside the enclosure into the enclosure. The expulsion of air from a drawing of air into the enclosure may cause the evacuation of the ethylene gas within the enclosure. As the enclosure keeps the fruit at a desired temperature and cycles the ethylene containing air with the air outside the enclosure, post-climacteric fruit may ripen at a slower rate, preserving desired characteristics of the fruit for a longer time.

Figure 1:
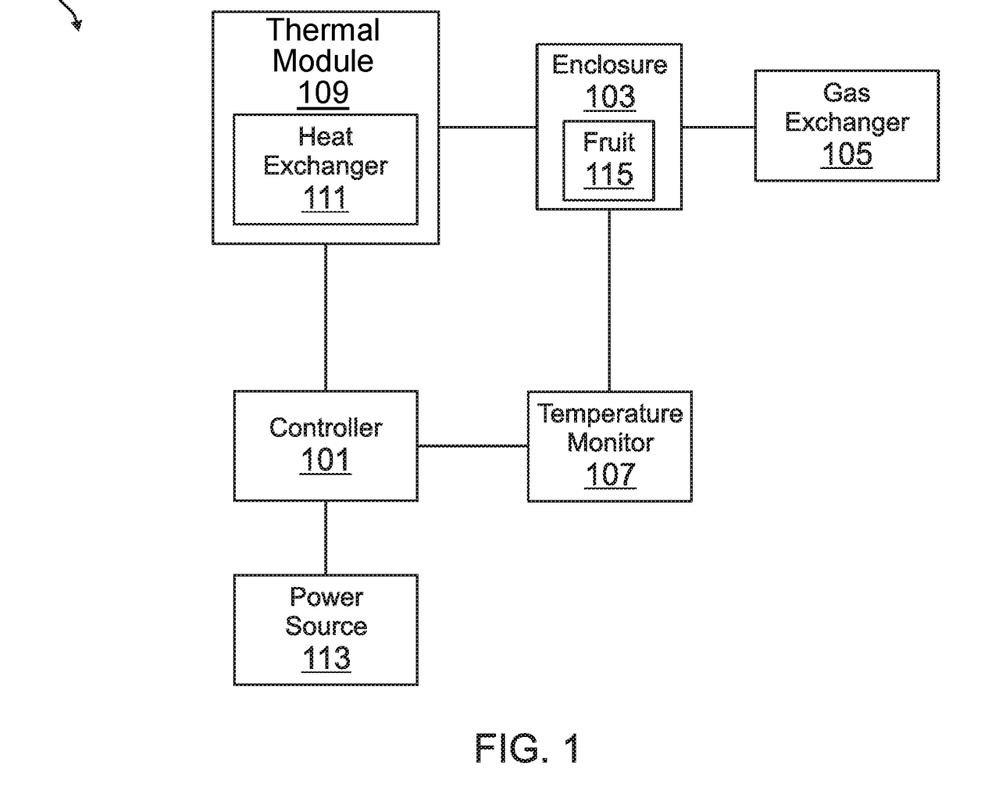
FIG. 1 is a block diagram illustrating an exemplary system for storing post-climacteric fruit according to an aspect of the present disclosure.

FIG. 1 is a block diagram of a system 100 for storing post-climacteric fruit. As shown, the system 100 may include an enclosure 103 for storing fruit 115. The fruit 115 may be any type of fruit or combination of fruit that experiences climacteric events. For example, the fruit 115 may include apples, bananas, apricots, melons, tomatoes, among other similarly ripening fruits. The enclosure 103 may be a box or other container that is large enough to store a desired amount of the fruit 115. For example, in some implementations, the enclosure 103 may be sufficiently large to store fruit for a fruit vendor, a restaurant, a producer, or other individual or operation that stores large amounts of fruit. Conversely, the enclosure 103 may be suitably small for home use, such as on a counter or in a cupboard.

Additionally, the enclosure 103 may include an access mechanism that allows an individual to place fruit 115 within and remove fruit 115 from the enclosure 103. Additionally, the access mechanism for the enclosure 103 may be closeable such that when the access mechanism is closed, the access mechanism provides an airtight seal for the enclosure. In exemplary implementations, the access mechanism may be a hinged door, a sliding door, a lid, or other means of providing access to the interior of the enclosure 103.

In some embodiments, the system 100 may include a thermal module 109. The thermal module 109 may be a device mounted within the enclosure 103 that can cool or heat the air within the enclosure 103. When cooling the air within the enclosure 103, the thermal module 109 may absorb heat from the air inside the enclosure 103 and radiate the absorbed heat into the environment outside the enclosure 103. Also, the thermal module 109 may absorb heat from outside the enclosure 103 and heat the air/gas mixture inside the enclosure 103. The thermal module 109 may be a thermoelectric cooler that uses the Peltier effect to pump heat directly between the air inside the enclosure 103 and the air outside the enclosure 103. For example, a voltage may be applied to the thermoelectric cooler at a fixed, nominal operating voltage. When switching between cooling and heating, a polarity switch may reverse the polarity of the supplied voltage to the thermoelectric cooler may be reversed. Alternatively, the thermal module 109 may use vapor compression or other means to control the temperature within the enclosure 103.

In some embodiments, the thermal module 109 may include two different heat exchanging devices, a first thermal module 109 for cooling the air enclosed within the enclosure 103 and a second thermal module 109 for heating the air enclosed within the enclosure 103. For example, the second thermal module 109 may be a heating element. Alternatively, when in a warm environment, the thermal module 109 may cool the interior of the enclosure 103 and heat conducted from outside the enclosure 103, through the walls of the enclosure 103, may heat the interior of the enclosure 103. Similarly, when in a cold environment, the thermal module 109 may heat the interior of the enclosure 103 and heat conducted from inside the enclosure 103, through the walls of the enclosure 103, may cool the interior of the enclosure 103.

In some exemplary embodiments, the system 100 may include a heat exchanger 111 as part of the thermal module 109. The heat exchanger 111 may be mounted near the fruit 115 within the enclosure 103 or at another location within the enclosure 103. The heat exchanger 111 may facilitate the transfer of heat between the thermal module 109 and the air within the enclosure 103. For example, when cooling the air in the enclosure 103, the heat exchanger 111 may absorb heat from the enclosed air and conduct the heat to the thermal module 109 for radiation into the external environment. When heating the air in the enclosure 103, the heat exchanger 111 may absorb heat from the thermal module 109 for conduction into the air within the enclosure 103.

In some embodiments, the thermal module 109 and the heat exchanger 111 may function together to maintain the temperature within the enclosure 103 within an operating temperature range about a desired storage temperature. For example, the fruit 115 within the enclosure 103 may have a desired storage temperature. As used herein, the phrase "desired storage temperature" may refer to a temperature that preserves a desirable quality of the fruit 115. In the case of bananas, the desired storage temperature may be a temperature that has been found to retard the ripening of post-climacteric bananas. For example, 57° F. has been found to retard the ripening of bananas. Accordingly, when the fruit 115 within the enclosure 103 is bananas, the thermal module 109 may function to keep the operating temperature range in the enclosure 103 within 57° F.+/−a swing temperature.

In exemplary embodiments, to maintain the fruit 115 at the desired storage temperature, the system 100 may include a temperature monitor 107. The temperature monitor 107 may be a sensor or series of sensors that monitor temperatures of environments that affect the temperature within the enclosure 103. For example, the temperature monitor 107 may include sensors mounted within the enclosure 103 and/or outside the enclosure 103.

In additional embodiments, the temperature monitor 107 may include a thermometer that is mounted within the enclosure 103 that provides a digital measurement for additional processing. Also, the temperature monitor 107 may be a temperature-sensitive switch, such as a bimetallic strip, a thermocouple, and the like. In some implementations, the temperature monitor 107 may include multiple switches, where each switch is associated with a different sensed temperature. For example, one switch may indicate when the temperature within the enclosure 103 is at a high temperature, and another switch may indicate when the temperature within the enclosure 103 is at a low temperature.

In certain embodiments, the system 100 may include a controller 101. The controller 101 may be an electrical device that receives temperature measurements from the temperature monitor 107. The controller 101 may use the temperature measurements to control the operation of the thermal module 109. For example, the temperature monitor 107 may indicate to the controller 101 that the temperature within the enclosure 103 is at a high temperature, where the high temperature may be equal to a desired storage temperature plus a swing temperature. When the controller 101 receives an indication from the temperature monitor 107 that the temperature within the enclosure 103 is at the high temperature, the controller 101 may direct the thermal module 109 to cool the air within the enclosure 103. Additionally, the temperature monitor 107 may indicate to the controller 101 that the temperature within the enclosure 103 is at a low temperature, where the low temperature may be equal to a desired storage temperature minus a swing temperature. When the controller 101 receives an indication from the temperature monitor 107 that the temperature within the enclosure 103 is at a low temperature, the controller 101 may direct the thermal module 109 to enter a mode that causes the temperature within the enclosure 103 to increase.

In some embodiments, the controller 101 may send a control signal to direct the thermal module 109 to turn on or turn off. Alternatively, the controller 101 may send a signal to the thermal module 109 that controls the rate at which the thermal module 109 changes the temperature within the enclosure 103. For example, the thermal module 109 may attempt to change the temperature within the enclosure 103 in proportion to the voltage and current of a received control signal from the controller 101. Further, the thermal module 109 may have a separate computation device that communicates with the controller 101. In further implementations, the controller 101 may be able to transmit information related to the present state of the system 100 to other devices over a communication network such as Wi-Fi, Bluetooth, Zigbee, and the like.

In some embodiments, the controller 101 may provide a user interface to allow a user to control the operation of the system 100. Examples of controls provided in the user interface may include manual inputs of the desired storage temperature. Additionally, inputs may include a desired temperature swing. Alternatively, the system 100 may store information for different fruits, and a user may simply select a fruit listed in the system. The stored, fruit-specific information may be set up by a manufacturer or by a user. The user interface may be found on a panel on the enclosure 103, or the controller 101 may communicate with another device such as a computer, smartphone, or other computational devices.

In exemplary embodiments, the controller 101 may include analog circuitry, digital circuits, a processor, or a series of processors. As used herein, one or more processors, such as a processing unit or other computational device, used in the present system and methods to process signals and measurements and provide controlling instructions may be implemented using software, firmware, hardware, circuitry, or any appropriate combination thereof. The one or more processors may be supplemented by, or incorporated in, specially-designed application-specific integrated circuits (ASICs) or field programmable gate arrays (FPGAs). The one or more processors may also include or function with software programs, firmware, or other computer-readable instructions for carrying out various process tasks, calculations, and control functions used in the present methods and systems.

Instructions for carrying out the various process tasks, calculations, and generation of other data used in the processing of data and signals produced during the operation of the methods described herein can be implemented in software, firmware, or other computer-readable instructions. These instructions are typically stored on any appropriate computer program product that includes a computer-readable medium used for storage of computer-readable instructions or data structures. Such a computer-readable medium can be any available media that can be accessed by a general-purpose or special-purpose computer or processor or any programmable logic device.

Suitable computer-readable storage media may include, for example, non-volatile memory devices including semiconductor memory devices such as Random Access Memory (RAM), Read Only Memory (ROM), Electrically Erasable Programmable ROM (EEPROM), or flash memory devices; magnetic disks such as internal hard disks or removable disks; optical storage devices such as compact discs (CDs), digital versatile discs (DVDs), Blu-ray discs; or any other media that can be used to carry or store desired program code in the form of computer-executable instructions or data structures.

In exemplary embodiments, the controller 101 may receive power from a power source 113. The power source 113 may provide electrical power to the various components of the system 100. In some implementations, the controller 101 may control the distribution of power to the various components of the system 100. The power source 113 may acquire power from an electrical receptacle, ethernet cable, batteries, and the like.

In certain embodiments, the system 100 may include a gas exchanger 105. The gas exchanger 105 allows gas to escape and enter the enclosure 103. For example, the gas exchanger 105 may allow the expansion of air within the enclosure 103 to force air out of the enclosure 103 and to allow the contraction of air within the enclosure 103 to draw air into the enclosure 103. Changes in the temperature of the air within the enclosure 103 may cause the air to expand and contract. As described above, the operating thermal module 109 or heat conducting through the walls of the enclosure 103 may cause the temperature changes.

In some implementations, the gas exchanger 105 may include two valves: an outlet valve and an inlet valve. The outlet valve may allow air to exit the enclosure 103, and the inlet valve may allow air to enter the enclosure 103. In some embodiments, the inlet valve and outlet valve may be check valves, such as flapper valves, duckbill valves, clapper valves, among other types of valves that allow air to pass through in one direction. Accordingly, as heat causes the air in the enclosure 103 to expand, air can pass through the outlet valve to the environment outside the enclosure. Similarly, as cooling the air in the enclosure 103 causes the air in the enclosure 103 to contract, air may pass through the inlet valve into the enclosure 103. In some implementations, valves in the gas exchanger 105 may have a cracking pressure that allows the air pressure within the enclosure 103 to equilibrate substantially with the environment containing the enclosure 103.

Alternatively, the gas exchanger 105 may include a simple orifice that allows for the exchanging of air/gas on both the heating and cooling portions of a thermal cycle. Additionally, the gas exchanger 105 may include slightly porous walls of the enclosure 103. Slightly porous walls may allow air to pass through the walls of the enclosure 103 to facilitate the exchange of air during the heating and cooling portions of the thermal cycle. Using porous walls or open orifices in the enclosure 103 may eliminate a differential pressure penalty related to the cracking pressure of the valves. However, using porous walls and open orifices removes the operation control and flexibility provided by controlling the placement of the outlet and inlet valves.

During operation, the controller 101 may control the thermal module 109 such that the temperature within the enclosure 103 cycles around the desired storage temperature, such that the average temperature within the enclosure 103 is the desired storage temperature. The air within the enclosure 103 expands and contracts as the air temperature in the enclosure 103 increases and decreases due to temperature cycling. The expansion and contraction of the air, and subsequent passage of air through the gas exchanger 105, may cause the air within the enclosure 103 to mix with the air in the environment containing the enclosure 103. The mixing of air within and outside the enclosure 103 may remove ethylene gas generated by the fruit 115 inside the enclosure 103. By keeping the average temperature at the desired storage temperature and by using the cycling of temperature to remove ethylene gas from the interior of the enclosure 103, the fruit 115 may be kept for a more extended period without becoming overripe.

Figure 2:
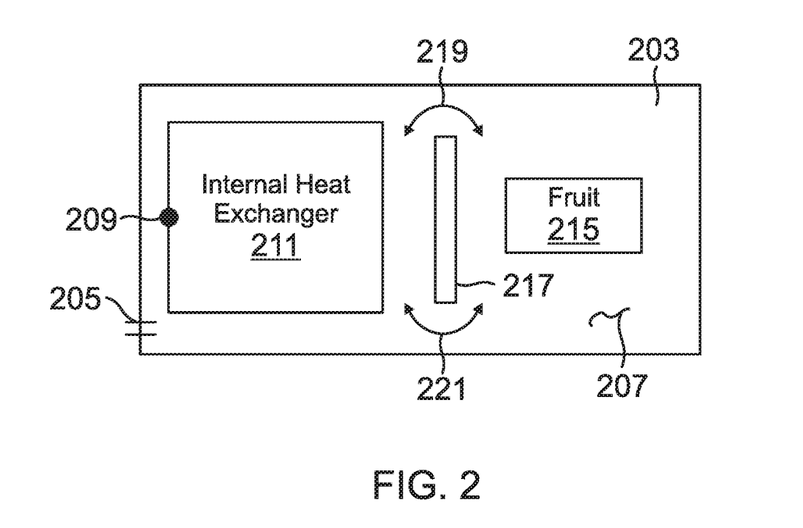
FIG. 2 is a diagram of an enclosure for storing post-climacteric fruit according to an aspect of the present disclosure.

FIG. 2 is a diagram of an enclosure 203 for storing post-climacteric fruit 215. As shown, the enclosure 203 may have substantially the same components as the system 100 in FIG. 1. In particular, the internal heat exchanger 211, temperature monitor 207, valves 205, and thermal module 209 may respectively function similarly to the heat exchanger 111, temperature monitor 107, gas exchanger 105, and thermal module 109. Additionally, the enclosure 203 may include a thermal shield 217. The thermal shield 217 may function to prevent direct thermal radiation coupling between the post-climacteric fruit 215 and the internal heat exchanger 211, thus reducing the temperature swing exposure of the fruit 215 during temperature cycling. The thermal shield 217 may also serve as one of the internal walls of the enclosure 203.

Like the thermal shield 217, the enclosure 203 may include a limited amount of thermal masses to enhance the efficiency of the thermal cycling performed within the enclosure 203. As used herein, a thermal mass may refer to a mass of material that stores and emits thermal energy. Thermal masses within the enclosure 203 may slow down the ability of the thermal module 209 to change the temperature within the enclosure 203. Accordingly, interior walls may be lined with a foam layer (or other insulative material) and a thin plastic layer overlaying the foam layer, with little exposed metal. Additionally, the thermal shield 217 may be made from an insulative material to limit the thermal masses within the enclosure 203. Further, a thermally reflective surface (like reflective metal foil) on the inner side of the internal heat exchanger 211 may also reflect thermal radiation. By reducing the thermal mass within the enclosure 203, the speed of the thermal cycle may be increased, thus limiting the effect of the temperature changes on the fruit. A fast thermal cycle may limit the temperature change of the fruit, to maintain the temperature of the fruit near the desired storage temperature.

In some embodiments, the thermal shield 217 may allow the air in the enclosure 203 to move around the thermal shield 217. The movement of the air around the thermal shield 217 may also circulate the air around the post-climacteric fruit 215. As stated above, circulating the air around the post-climacteric fruit 215 may flush away the ethylene emitted from the post-climacteric fruit 215. For example, the thermal shield 217 may be vertically positioned within the enclosure 203. Additionally, the enclosure 203 may include an upper air passage 219 above the thermal shield 217 and a lower air passage 221 below the thermal shield 217. The upper air passage 219 and the lower air passage 221 may be holes, channels, gaps, or other structure that permits the free passage of air around the thermal shield 217, to facilitate the circulation of air around the post-climacteric fruit 215.

In exemplary embodiments, when cooling the enclosure 203, warmer air may flow out of the enclosure 203 through the upper air passage 219, and cooler air may flow into the enclosure 203 through the lower air passage 221. When warming the enclosure 203, warmer air may flow into the enclosure 203 through the upper air passage 219, and cooler air may flow out of the enclosure 203 through the lower air passage 221. In some implementations, the thermal shield 217 may be mounted to the interior surfaces of the enclosure 203. Accordingly, the thermal shield 217 may also function as a barrier between a user-accessible fruit storage space and a compartment for operational components and control systems.

Figure 3:
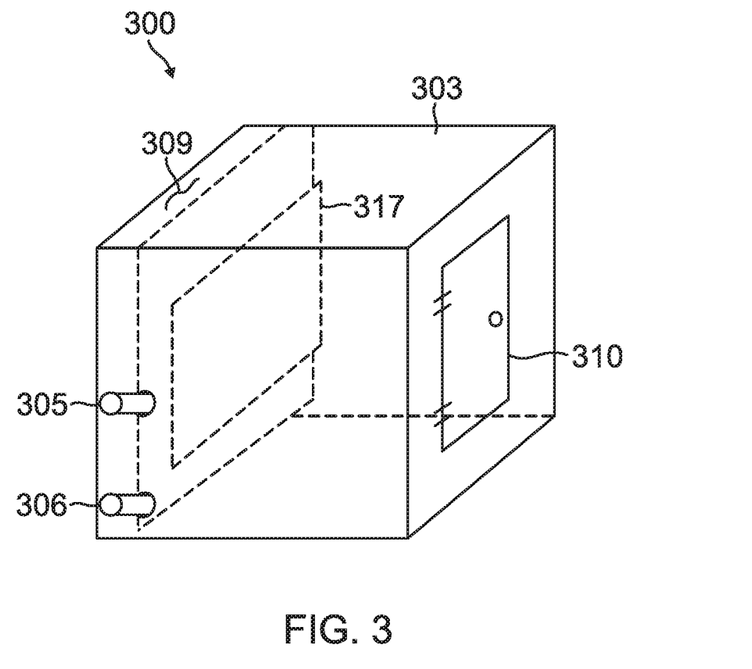
FIG. 3 is a diagram of a further enclosure for storing post-climacteric fruit according to an aspect of the present disclosure.

FIG. 3 is a diagram of an enclosure 303 for storing post-climacteric fruit. As shown, the enclosure 303 may include a thermal shield 317 and a thermal module 309 that function similarly to the thermal shield 217 and thermal module 209 in FIG. 2. Additionally, the enclosure 303 may include an inlet valve 305 and an outlet valve 306 that substantially function as described above with relation to the gas exchanger in FIG. 1. Further, as illustrated, the enclosure 303 may have an access mechanism 310. The access mechanism 310 may be located at a position that is convenient for a user to access a user-accessible storage space within the enclosure 303. For example, the access mechanism may be located on a front face, a side face, a top face, or other faces of the enclosure 203.

Figure 4:
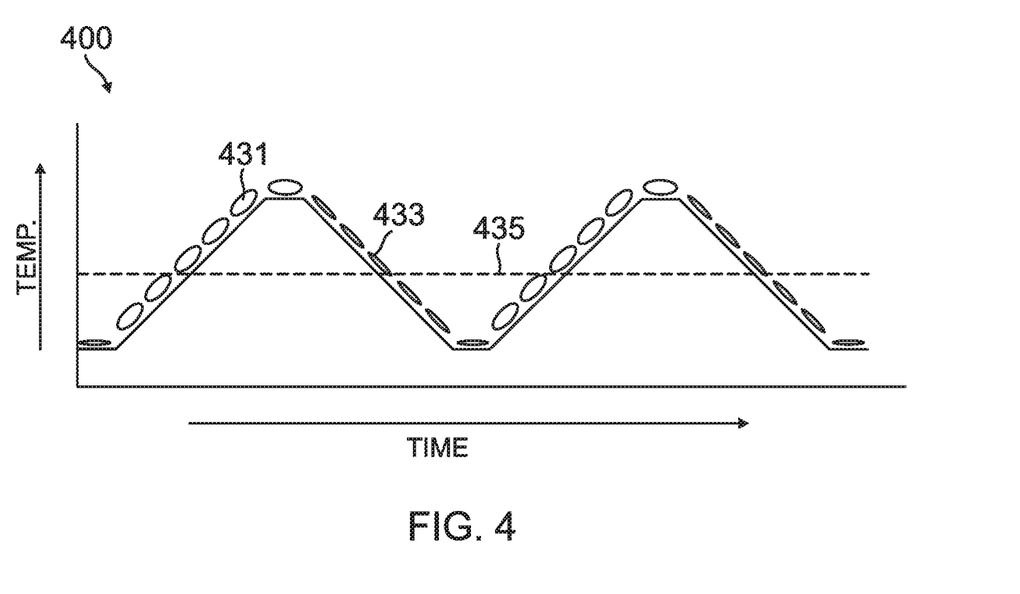
FIG. 4 is a graph illustrating temperature change within an enclosure for storing post-climacteric fruit according to an aspect of the present disclosure.

FIG. 4 is an illustration of a graph 400 illustrating the controlled temperature cycling that occurs during the operation of the control systems for an enclosure of post-climacteric fruits. As illustrated, the temperature may increase and decrease periodically. During an increase in temperature, the enclosure enters an expansion state 431. As described above, during an expansion state 431, the air in the enclosure warms and expands. The expansion causes a portion of the air within the enclosure to exit the enclosure through one or more valves. During a decrease in temperature, the enclosure enters a contraction state 433. As described above, during a contraction state 433, the air in the enclosure cools and contracts, causing air outside the enclosure to enter the enclosure through one or more valves.

In the illustrated example, the controller may keep the enclosure in the expansion state 431 and the contraction state 433 for substantially the same amount of time. However, the controller may maintain the enclosure in the expansion state 431 for a different amount of time than the contraction state 433. For example, when different mechanisms are used to cool and warm the air in the enclosure, the enclosure may spend more time in the expansion state 431 than in the contraction state 433 or vice versa. Additionally, a controller may cycle the temperature of the air in the enclosure such that the average temperature of the air within the enclosure is substantially equal to a desired temperature 435 for the fruit stored in the enclosure.

As described above, a gas volume expands or contracts in proportion to the absolute temperature of the air. For example, when using the Rankine temperature, that is the temperature in Fahrenheit plus the magnitude of absolute zero (about 460 degrees Fahrenheit), a typical setting for the average temperature of the interior of the enclosure may be about 517° R. In some implementations, the thermal module may cause the temperature to swing through the range of +/−10° R. As such, the air temperature inside the enclosure may vary between 507° R and 527° R, which temperatures may function as the hot and cold limits of the thermal cycle.

When using 507° R and 527° R as the thermal limits, the change in volume of the air/gas within the enclosure may roughly equal the ratio of cold to hot Rankine temperatures. As such, for the change in temperature from 507° R to 527° R, the interior volume may increase by 527°/507° or 1.039 times. The change in volume may equal the amount of air/gas that could be exhausted during the expansion state 431 and be equal to the amount of air/gas that could be drawn into the enclosure during each thermal cycle. Accordingly, in terms of percentage, approximately 4% of the air/gas volume could be exhausted per thermal cycle. The time length of each cycle may depend on multiple factors. For example, the time length may depend on the capacity of the heat exchanger used within the enclosure.

While exemplary, during a thermal cycle that lasts for five minutes, 4% of the volume may be exhausted during an expansion state 431. As such, the amount of air equal to the volume of the enclosure may be exhausted in 125 minutes. Because ethylene gas is slowly emitted from the fruit, a time of approximately two hours may provide sufficient flushing of the air within the enclosure to also remove the emitted ethylene gas. The temperatures and times used above are exemplary, and other temperatures and times may be used depending on the fruit and other capabilities of the thermal module and heat exchanger.

Figure 5A:
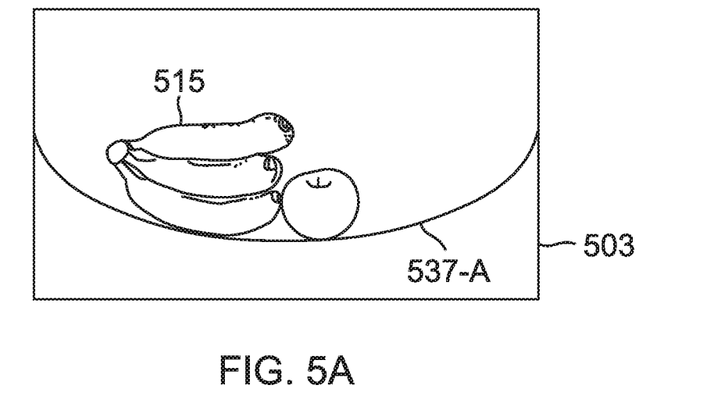
FIGS. 5A-5C illustrate different supports for storing post-climacteric fruit within an enclosure according to an aspect of the present disclosure.
Figure 5B:
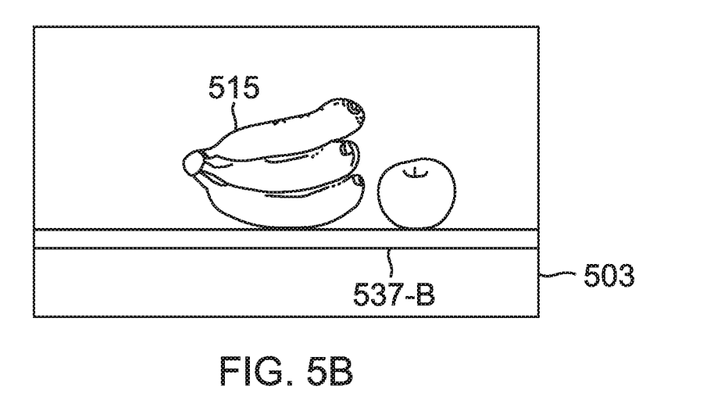
Figure 5C:
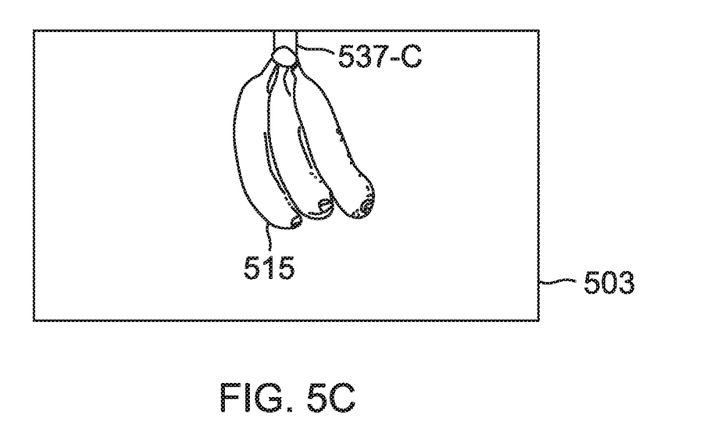

FIGS. 5A-5C illustrate various embodiments of potential support structures 537-A-537-B that may be found within an enclosure 503. The enclosure 503 may be similar to the enclosures 103, 203, and 303 described above concerning FIGS. 1-3. As used herein, the support structures 537-A-537-B (referred to collectively and generally as support structure 537) may be a structure that supports fruit 515 within the enclosure 503. In some implementations, a support structure 537 may be made from an insulative material that permits sufficient passage of air through the support structure 537 to flush ethylene gas away from the fruit 515 but also limits the airflow to limit the temperature changes to the fruit 515. Additionally, the support structure 537 may be removable to facilitate washing of the support structure 537 and the interior of the enclosure 503.

FIG. 5A illustrates a support structure 537-A that functions as a net to hold the fruit 515 within the enclosure 503. For example, the support structure 537-A may be a net that is mounted to sidewalls of the enclosure 503. The net may be a mesh of fabric, silicone rubber, or other suitable material. Also, the net may have larger openings near the sidewalls of the enclosure 503 than in the center of the net. The varying size of holes may facilitate the convective flow of air generated by the thermal cycling.

FIG. 5B illustrates a support structure 537-B that functions as a shelf to hold the fruit 515 within the enclosure 503. For example, the support structure 537-B may be a shelf that is mounted to sidewalls of the enclosure 503. The shelf may be made of a rigid, insulative material like plastic, wood, or other insulative material. Further, like the net, the shelf may have larger openings near the sidewalls of the enclosure 503 than in positions where the fruit 515 is located. Alternatively, the shelf may have evenly distributed openings. Additionally, the enclosure 503 may include multiple shelves.

FIG. 5C illustrates a support structure 537-C that functions as a hook for holding the fruit 515 within the enclosure 503. For example, the hook may be mounted to a top, interior surface of the enclosure 503. The hook may suspend some fruits, like bananas, on the vine tomatoes, and the like, within the enclosure 503. The hook may allow the free passage of air around the fruit, which may aid in flushing air away from the fruit 515.

Figure 6:
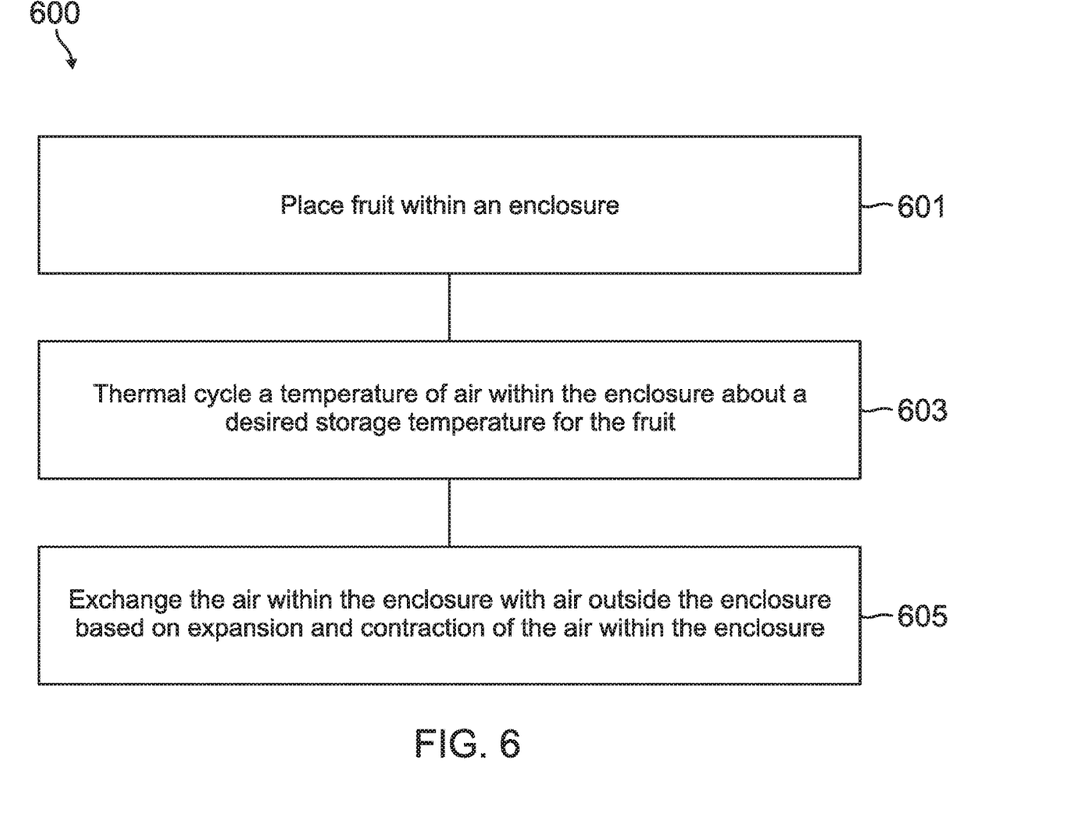
FIG. 6 is a flowchart diagram of a method for storing post-climacteric fruit within an enclosure according to an aspect of the present disclosure.

FIG. 6 is a flowchart diagram of a method 600 for storage of post-climacteric fruit. The method 600 proceeds at 601, where fruit is placed within an enclosure. Also, the method 600 proceeds at 603, where a temperature of air within the enclosure is thermal cycled about a desired storage temperature for the fruit. Additionally, the method 600 proceeds at 605, where the air within the enclosure is exchanged with air outside the enclosure based on expansion and contraction of the air within the enclosure.

EXAMPLE EMBODIMENTS

Example 1 includes a system comprising: an enclosure having an interior volume for storing fruit therein; a thermal module that cools and heats air within the interior volume of the enclosure; a gas exchanger that allows air to move in and out of the enclosure; and a controller that directs the thermal module to thermal cycle a temperature of the air within the interior volume about a desired storage temperature.

Example 2 includes the system of Example 1, wherein the thermal module is a thermoelectric heat exchanger.

Example 3 includes the system of Example 2, wherein the controller periodically causes a polarity switch that causes the thermoelectric heat exchanger to switch between cooling and heating the interior volume of the enclosure.

Example 4 includes the system of any of Examples 1-3, further comprising a thermal shield between the thermal module and a fruit storage space within the interior volume of the enclosure.

Example 5 includes the system of Example 4, wherein the thermal shield has a thermally reflective surface facing the thermal module.

Example 6 includes the system of Example 5, further comprising a support structure for supporting the fruit within the interior volume of the enclosure.

Example 7 includes the system of Example 6, wherein a plurality of holes extends through the support structure.

Example 8 includes the system of Example 7, wherein at least one of size and placement of holes in the plurality of holes through the support structure varies.

Example 9 includes the system of any of Examples 6-8, wherein the support structure is at least one of: a hook; a net; and a shelf.

Example 10 includes the system of any of Examples 1-9, wherein interior surfaces of the enclosure comprise: a foam layer; and a thin plastic layer overlaying the foam layer and facing the interior volume of the enclosure.

Example 11 includes the system of any of Examples 1-10, wherein the gas exchanger is at least one of: at least two check valves; at least one orifice formed through a wall of the enclosure; and a porous surface forming a barrier between the interior volume of the enclosure and an external environment.

Example 12 includes the system of any of Examples 1-11, wherein the controller further comprises an interface for allowing a user to control the thermal cycle.

Example 13 includes a method comprising: placing fruit within an enclosure; thermal cycling a temperature of air within the enclosure about a desired storage temperature for the fruit; and exchanging the air within the enclosure with air outside the enclosure based on expansion and contraction of the air within the enclosure.

Example 14 includes the method of Example 13, further comprising monitoring the temperature of the air within the enclosure.

Example 15 includes the method of any of Examples 13-14, further comprising insulating a fruit storage space from a thermal module within the enclosure, wherein the thermal module heats and cools the air within the enclosure during the thermal cycling.

Example 16 includes the method of any of Examples 13-15, wherein exchanging the air within the enclosure with the air outside the enclosure comprises exchanging the air through at least one of: at least two check valves; at least one orifice formed through a wall of the enclosure; and a porous surface forming a barrier between an interior volume of the enclosure and an external environment.

Example 17 includes the method of any of Examples 13-16, wherein thermal cycling the temperature of the air within the enclosure comprises at least one of: using a thermoelectric cooler to heat and cool the air within the enclosure, wherein the thermoelectric cooler heats and cools based on a polarity of provided power: using a heating element to heat the air within the enclosure; and allowing the heat in the air to conduct through external surfaces of the enclosure.

Example 18 includes the method of any of Examples 13-17, wherein placing the fruit within the enclosure comprises placing the fruit on a support structure.

Example 19 includes the method of Example 18, wherein the support structure is at least one of: a hook; a net; and a shelf.

Example 20 includes a system comprising: an enclosure having an interior volume for storing fruit therein; a thermal module that cools and heats the interior volume of the enclosure through an internal heat exchanger; a temperature monitor for monitoring a temperature of air within the enclosure; a gas exchanger that allows air to move in and out of the enclosure; a thermal shield within the enclosure, wherein the thermal shield is located between an internal heat exchanger and a fruit storage space within the enclosure; and a controller that directs the thermal module to thermal cycle the temperature within the interior volume about a desired storage temperature based on the temperature of the air within the enclosure, wherein an average temperature of the air within the enclosure is substantially equal to the desired storage temperature.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
   an enclosure having an interior volume, wherein the interior volume is configured for storing fruit therein;
   a thermal module configured to cool and heat air within the interior volume of the enclosure;
   a gas exchanger; and
   a controller configured to direct the thermal module to alternate between an expansion state and a contraction state, wherein the thermal module decreases a temperature of the air within the interior volume to contract the air within the interior volume during the contraction state and increases the temperature to expand the air within the interior volume during the expansion state, wherein the thermal module increases and decreases the temperature of the air within the interior volume within a swing temperature of a desired storage temperature, wherein a portion of the air within the interior volume is pushed out of the enclosure through the gas exchanger during the expansion state and gas outside the enclosure is drawn into the interior volume through the gas exchanger during the contraction state to mix the air within the interior volume with the gas outside the enclosure.

2. The system of claim 1, wherein the thermal module is a thermoelectric heat exchanger.

3. The system of claim 2, wherein the controller is configured to periodically switch polarity of power provided to the thermoelectric heat exchanger.

4. The system of claim 1, further comprising a thermal shield between the thermal module and a fruit storage space within the interior volume of the enclosure.

5. The system of claim 4, wherein the thermal shield has a thermally reflective surface facing the thermal module.

6. The system of claim 1, further comprising a support structure for supporting the fruit within the interior volume of the enclosure.

7. The system of claim 6, wherein a plurality of holes extends through the support structure.

8. The system of claim 7, wherein at least one of size and placement of holes in the plurality of holes through the support structure varies.

9. The system of claim 6, wherein the support structure is at least one of:
   a hook;
   a net; and
   a shelf.

10. The system of claim 1, wherein interior surfaces of the enclosure comprise:
    a foam layer; and
    a thin plastic layer overlaying the foam layer and facing the interior volume of the enclosure.

11. The system of claim 1, wherein the gas exchanger is at least one of:
    at least two check valves;
    at least one orifice formed through a wall of the enclosure; and
    a porous surface forming a barrier between the interior volume of the enclosure and an external environment.

12. The system of claim 1, wherein the controller further comprises an interface for allowing a user to control the controller.

13. A system comprising:
    an enclosure having an interior volume, wherein the interior volume is configured to store fruit therein;
    a thermal module configured to cool and heat the interior volume of the enclosure through an internal heat exchanger;
    a temperature monitor for monitoring a temperature of air within the interior volume;
    a gas exchanger configured to allow the air within the interior volume to move out of the enclosure and allow air outside the enclosure to move into the interior volume;
    a thermal shield within the enclosure, wherein the thermal shield is located between the internal heat exchanger and a fruit storage space within the interior volume; and
    a controller configured to direct the thermal module to thermal cycle the temperature within the interior volume about a desired storage temperature based on the temperature of the air within the interior volume;
    wherein the controller is configured to control the thermal cycling of the air within the enclosure by directing the thermal module to alternate between an expansion state and a contraction state, wherein the thermal module decreases the temperature to contract the air within the interior volume during the contraction state and increases the temperature to expand the air within the interior volume during the expansion state, wherein the thermal module increases and decreases the temperature of the air within the interior volume within a swing temperature of the desired storage temperature, wherein a portion of the air within the interior volume is pushed out of the enclosure through the gas exchanger during the expansion state and gas outside the enclosure is drawn into the interior volume through the gas exchanger during the contraction state, wherein the contraction and expansion of air within the interior volume is the primary cause of mixing the air within the interior volume with the gas outside the enclosure.

* * * * *